Nov. 9, 1937.  E. H. ARMSTRONG  2,098,698
RADIO TRANSMITTING SYSTEM
Filed Sept. 14, 1935  2 Sheets-Sheet 1

INVENTOR
Edwin H. Armstrong.
BY Moses & Nolte
ATTORNEYS

Nov. 9, 1937.  E. H. ARMSTRONG  2,098,698
RADIO TRANSMITTING SYSTEM
Filed Sept. 14, 1935  2 Sheets-Sheet 2

INVENTOR
Edwin H. Armstrong.
BY
ATTORNEYS

Patented Nov. 9, 1937

2,098,698

UNITED STATES PATENT OFFICE 2,098,698

RADIO TRANSMITTING SYSTEM

Edwin H. Armstrong, New York, N. Y.

Application September 14, 1935, Serial No. 40,543

3 Claims. (Cl. 250—17)

This invention relates to improvements in the transmitter for generating frequency modulated waves described in my United States Patent No. 1,941,068.

The object of the invention is the elimination of parasitic or undesired frequencies which are produced under certain conditions and which interfere with the accuracy of the balance which may be obtained at the receiver and which also cause interference in adjacent channels of communications.

The disturbing frequencies are eliminated by the use of a system of selective circuits at particular points in the system in the manner hereinafter described.

Figure 1:
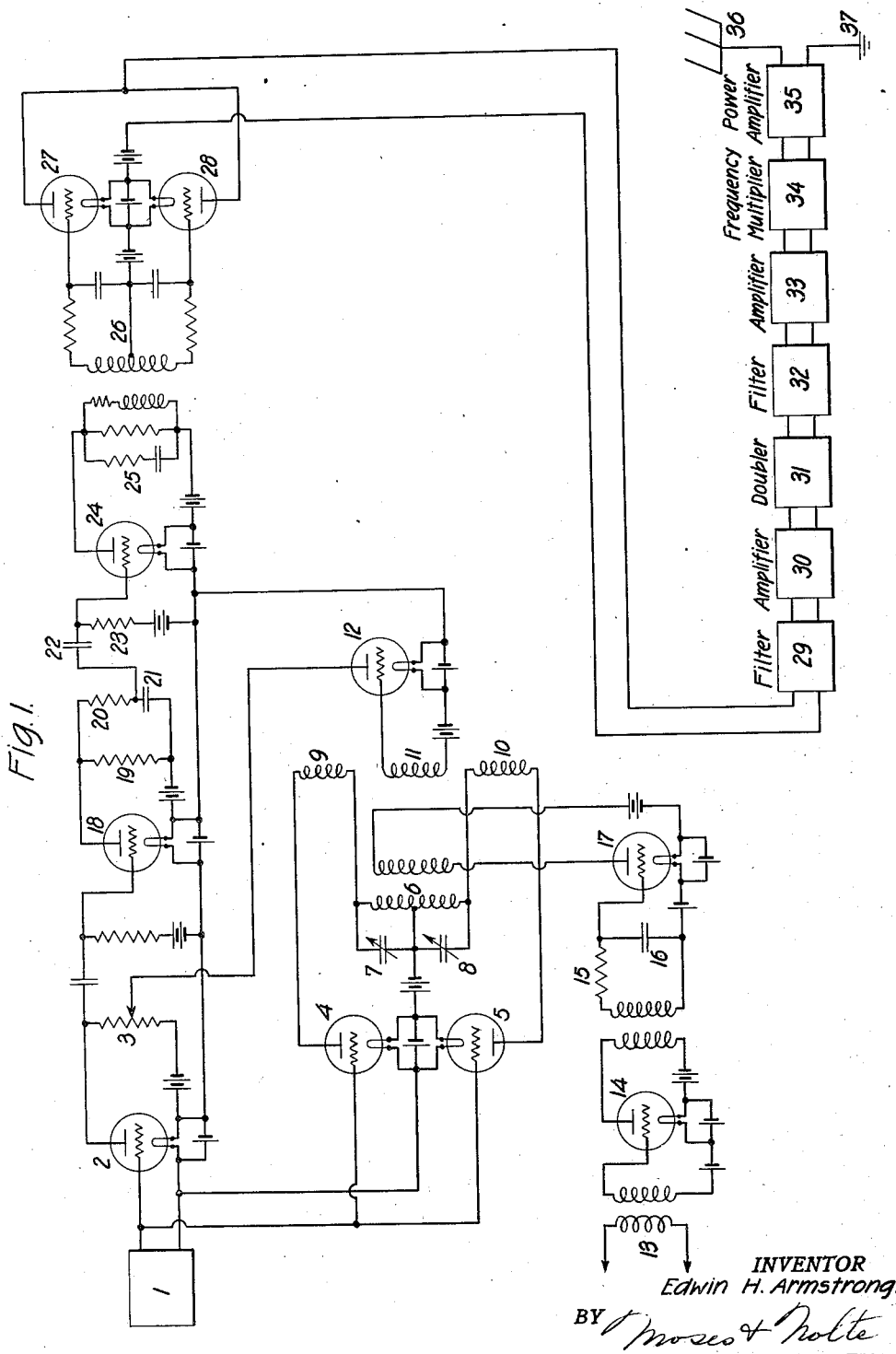
Figure 2:
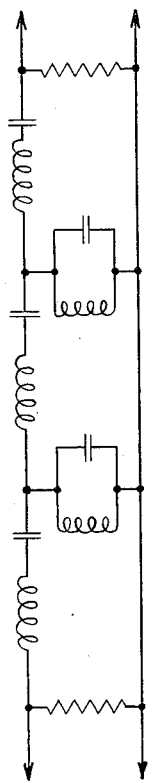
Figure 3:
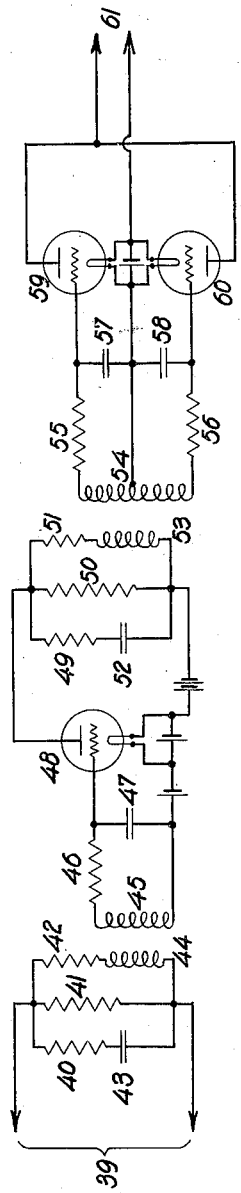
Figure 4:
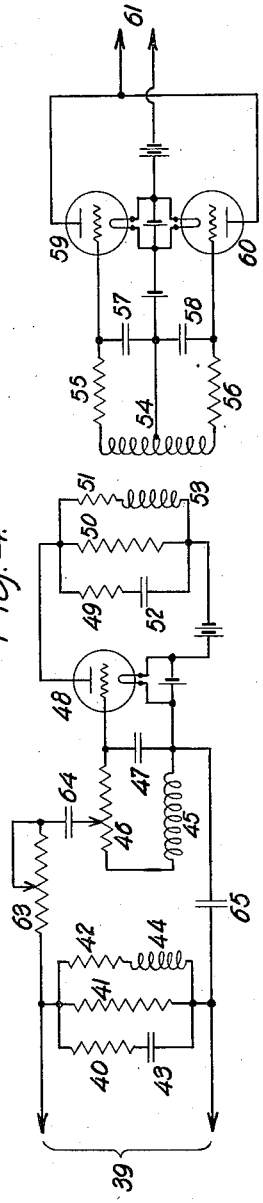

Referring now to the diagrams which form a part of this specification, Figure 1 illustrates the general arrangement of the transmitter and Figures 2, 3, and 4 the details of the selective circuits.

The type of transmitter to which this invention applies is that type of transmitter which produces a frequency modulated wave from a source of fixed phase and frequency. In this form of transmitter a current derived from a fixed frequency of, for example, 50,000 cycles per second is shifted in phase by an amount directly proportional to the amplitude of the modulating current and inversely proportional to its frequency, and the resulting current multiplied in frequency to give the required frequency deviation.

I have found that where the initial or starting frequency is low, as of the order of 50,000 cycles, there appears in the final or transmitted frequency a series of other frequencies which when there is no modulation applied, lie 50,000 cycles, 100,000 cycles etc. above and below the final frequency. Although these spurious frequencies can be created in many places in the circuits which handle the initial 50,000 cycle current due to overloading of the tubes, all of these sources with one exception can be eliminated by using the proper levels in the various tubes. The particular place in which the disturbance cannot be eliminated by these means is in the output circuit of the doubler tubes. It is the purpose of this specification to disclose means for eliminating the disturbances arising at this point.

Referring now to Figure 1, 1—17 represents the phase shifting system described in my U. S. Patent No. 1,941,068 whereby the frequency of the initial source of oscillations may be caused to vary in accordance with the modulation of the signal and 18—21 represents the compensation system for equalizing the side frequencies as described in my U. S. Patent No. 2,063,074 dated December 8, 1936. An amplifier 24 supplies the input circuits of the first doubler stage 27, 28 through the coupled circuits 25, 26 which are broadly tuned to pass the fundamental frequency and the side frequencies produced by the carrier suppression system 4—12, but which are sufficiently sharp to eliminate any incidental second harmonic which might be accidentally produced by overloading any of the tubes handling the radio frequency from the source 1. These harmonics are not of any importance except indirectly and can be easily prevented by keeping the levels at the proper value in the different amplifier tubes. 29 is a filter, 30 an amplifier, 31 a doubler and 32 a second filter, 33 is an amplifier, 34 represents a frequency multiplier of as many stages as is required, and 35 is the final power amplifier supplying power to the radiating system 36, 37.

The current which causes the difficulty, giving rise to the parasitic frequencies in the radiated wave, has its origin in the output of the doublers, and particularly in the output of the first and second doublers. The way in which the disturbance arises is the following. The doublers which are used are of the push pull type illustrated in Figure 1 in which the frequency to be doubled is balanced out and the second harmonic or doubled frequency is cumulatively combined. Actually, however, it is very difficult to secure or maintain an accurate balancing out of the frequency to be doubled so that both the doubled frequency and the initial frequency appear in the plate circuit. Between two stages in a doubler system it is customary to use a single tuned circuit. In the present system in order to pass all the frequencies of the modulated wave it is necessary to introduce resistance to broaden the band of the circuit and this is particularly true of the 50,000 cycle circuit where the speech band is a relatively large percentage of the fundamental frequency. Therefore the tuning in the lower frequency stages is not very sharp and there is always some value of 50,000 cycle current resulting from the unbalance which reaches the input of the second doubler stage in company with the 100,000 cycle current which is to be doubled by the second doubler. Unless the phase relation between the 50,000 cycle current and its harmonic is a certain exact value, very difficult to obtain practically, there will be created in the output of the second doubler, a phase modulated current, which is varied in phase 50,000 times per second. This phase modulation passes thru the rest of the doubling system, whether the doubling system limits amplitude or not and makes its appearance in the final stage thru the side frequencies to which reference has already been made.

The same process of modulation goes on, of course, in all stages of doubling but as the frequency increases the difference between the main frequency and side frequencies (initially produced in any particular stage) becomes greater and a single tuned circuit between stages, which may be made progressively sharper as the frequency increases, is sufficient to eliminate the side frequencies. As a practical matter, where the initial frequency is 50,000 cycles the first and second doubling stages are the only places where difficulty is likely to occur.

At these points, however, a very small amount of the 50,000 cycle current present in the input of the second doubler stage gives rise to serious difficulty. This is also true, though to a lesser extent, of the presence of 100,000 cycle current in the input of the third doubler stage.

The presence of side frequencies in the radiated wave which are produced in this way when they are any appreciable fraction of the fundamental frequency makes it impossible to secure a good balance at the receiver and produces all kinds of difficulties otherwise. It is therefore very important to eliminate them and it is the object of this invention to do so. I find that the use of a selective system in the position illustrated in Figure 1 before the second and third doubler stages and so designed that it passes the fundamental and modulation frequencies of the doubler output equally but attenuates the initial input or half frequency by a ratio of 100:1 is effective in general to eliminate all spurious side bands although in some cases over a 1000 to 1 reduction is necessary. These filters are placed in the positions 29, and 32 as shown in Figure 1. It is seldom necessary to use more than two filters and after the second stage the currents are doubled by the third doubler etc. amplified by the power amplifier 35 and supplied to the radiating system 36, 37.

There are, of course, many types of filters which might be employed to eliminate the undesired frequency, either high pass, band pass or a system of coupled circuits each individually heavily damped.

Figure 2 illustrates the ordinary band pass filter the design of which is so well understood in the art as to require no further comment here. Figure 3 illustrates a system of coupled circuits each of which is sufficiently damped to pass the required band and Figure 4 illustrates a modification of this system whose advantage will be pointed out later.

Referring now to Figure 3, the circuit 40—44 represents the output circuit of, for example, the first doubler and it is tuned to the doubled frequency. The two series resistances 40, 42 and the shunt resistance 41 are adjusted to give the proper band width of this circuit. 45, 46, 47 is a second tuned circuit likewise tuned to the doubled frequency and inductively coupled to the first circuit. 48 is an amplifier for this frequency and 49—53 is a tuned circuit in its plate which is similar in characteristics to the circuit 40—44. Inductively coupled to the coil 53 is a second tuned circuit 54—58 likewise tuned to the same frequency as its predecessors and so coupled and damped that it passes the proper band. 59, 60 represent the second doubler stage, the output of which, 61, may be fed to a system similar to that just described. I find that with the above arrangement it is possible to use a modulating frequency of 10,000 cycles on an initial frequency of 50,000 cycles, maintaining a flat characteristic up to this point while at the same time eliminating the undesired side frequencies.

Figure 4 illustrates an arrangement similar to that of Figure 3 except with respect to the nature of the coupling between the first and second tuned circuits. I find that by the use of a resistance coupling between these circuits it is possible to produce a still greater reduction in the undesired side frequencies without disturbing in any way the flat characteristic. The reason for this is that with an inductive coupling the phase relation between the fundamental and the doubled frequencies as they are supplied to the second doubler is approximately that which gives rise to the greatest amplitude of side frequencies. By using a resistance coupling this phase relationship is shifted to approximately the best value with the result that the side frequencies are practically wiped out.

In Figure 4 there is illustrated the same arrangement shown in Figure 3 with the exception that there is no magnetic coupling between coils 44 and 45. Coupling between the circuits is provided by means of a high resistance 63 which may be of the order of 50,000 or 100,000 ohms. The two condensers 64 and 65 are blocking condensers to block out the direct current from the plate supply of the preceding doubler. They are made sufficiently large so that their reactance is negligible with respect to the resistance of 63 and play no part in the coupling. The resistances 63 and 64 are adjustable as shown in order to shift the relative phases to the best point.

I have described what I believe to be the best embodiments of my invention. I do not wish, however, to be confined to the embodiment shown, but what I desire to cover by Letters Patent is set forth in the appended claims.

I claim:

1. A system for transmitting a wide band frequency-modulated wave substantially free from undesired frequency variations resulting from the reaction of the master oscillator current upon the output current of the succeeding multiplier stage, said system comprising a low frequency master oscillator, frequency varying means therefor and a series of frequency multipliers, of means for preventing the master oscillator from causing a variation in frequency of the transmitted wave corresponding to its own frequency, said means comprising a frequency selective system arranged to exclude the fundamental frequency from the second of said series of frequency multipliers.

2. A system for transmitting a wide band frequency modulated wave substantially free from undesired frequency variations resulting from the reaction of the master oscillator and the initial frequency multiplier currents upon the output currents of their succeeding multiplier stages, said system comprising a low frequency master oscillator, frequency varying means therefor and a series of frequency multipliers, of means for preventing the master oscillator or the initial multiplier stages from introducing in the transmitted wave disturbing frequency variations corresponding to their respective frequencies, said means comprising frequency selective systems introduced in the output of the multiplier stages in which the disturbing frequency variations originate to prevent the fundamental frequency supplied to any multiplier stage from reaching the succeeding stage.

3. In a multi-stage frequency multiplier, means between two or more successive stages of the multiplier, selective to frequency, so as to substantially exclude from a succeeding multiplier the fundamental frequency supplied to the preceding multiplier, said selective means including phase adjusting means for changing the phase of such residual fundamental frequency as does pass the selecting means, to a point at which the disturbance caused by said residual fundamental frequency is a minimum.

EDWIN H. ARMSTRONG.